United States Patent
Buchholtz

(12) 
(10) Patent No.: US 6,688,243 B1
(45) Date of Patent: Feb. 10, 2004

(54) MINIMUM TILLAGE AGRICULTURAL IMPLEMENT HAVING FURROW OPENING SHANK ASSEMBLIES

(75) Inventor: Paul H. Buchholtz, Rosalia, WA (US)

(73) Assignee: The McGregor Company, Colfax, WA (US)

( * ) Notice: Subject to any disclaimer, the term of this patent is extended or adjusted under 35 U.S.C. 154(b) by 0 days.

(21) Appl. No.: 10/229,549

(22) Filed: Aug. 28, 2002

(51) Int. Cl.$^7$ ................................................ A01C 5/06
(52) U.S. Cl. ....................................................... 111/139
(58) Field of Search ................................ 172/584, 586, 172/579, 580, 581, 166, 599, 156, 600, 699, 603, 142, 145, 175, 178, 152, 153, 196, 138, 139; 111/52, 62, 134, 135, 139, 144, 149, 163, 164

(56) References Cited

U.S. PATENT DOCUMENTS

| | | | |
|---|---|---|---|
| 3,736,999 A | 6/1973 | Randol et al. | 172/759 |
| 3,999,614 A | 12/1976 | Rhoads | 172/719 |
| 4,601,248 A | 7/1986 | Beasley | 111/52 |
| 4,762,075 A | 8/1988 | Halford | 111/73 |
| 4,799,823 A | 1/1989 | Williams | 405/180 |
| 4,926,767 A | 5/1990 | Thomas | 111/187 |
| 4,932,478 A | 6/1990 | Jones | 172/889 |
| 5,165,487 A | 11/1992 | Williams et al. | 172/699 |
| 5,303,662 A | 4/1994 | Drake | 111/52 |
| 5,333,694 A * | 8/1994 | Roggenbuck et al. | 172/156 |
| 5,529,128 A * | 6/1996 | Peterson et al. | 172/145 |
| 5,540,288 A * | 7/1996 | Dietrich, Sr. | 172/196 |
| 5,724,903 A | 3/1998 | Yoder et al. | 111/164 |
| 5,787,994 A | 8/1998 | Friesen | 172/772.5 |
| 5,819,855 A | 10/1998 | Tarver, III | 172/166 |
| 6,009,955 A | 1/2000 | Tarver, III | 172/166 |
| 6,276,462 B1 * | 8/2001 | Dietrich, Sr. | 172/138 |
| 6,325,156 B1 * | 12/2001 | Barry | 172/518 |
| 6,345,671 B1 | 2/2002 | Siemens et al. | 172/556 |
| 6,397,767 B1 | 6/2002 | Dietrich, Sr. | 111/119 |
| 6,612,381 B2 * | 9/2003 | Powell et al. | 172/586 |

OTHER PUBLICATIONS

Stelljes, Kathryn Barry; "New Tool Improves No–Till Seeding", Nov. 21, 2000, pp. 1–2; http://www.ars.usda.gov/is/pr/2000/001121.htm.

Siemens, Dr. Mark, USDA–ARS, CPCRC, Pendleton, OR; (Video of Movie and Text) "Copy of Residue Management Wheel 2001".

* cited by examiner

Primary Examiner—Robert E. Pezzuto
(74) Attorney, Agent, or Firm—Wells St. John P.S.

(57) ABSTRACT

A minimum tillage agricultural implement 10 having a plurality of laterally spaced shank assemblies 60, 62 mounted on a transverse tool bar 56, 58. Each shank assembly 60, 62 has an elongated narrow upright shank 70 that extends downward from the tool bar 56, 58 to a working point 78 for forming a narrow furrow 12 in soil covered with agricultural residue. Each shank assembly 60, 62 has a set of residue control wheels 130, 132 that straddle the shank 70 with the axes 134, 136 of rotation of the residue control wheels 130, 132 being located rearward of a front edge reference segment 82 of the shank 70 by a distance "A" of less than a diameter of the wheels 130 or 132 for engaging and stabilizing the soil and agricultural residue downward and under the wheels and away from the shank 70. In an alternate embodiment, the residue control wheels 130, 132 are longitudinally offset with the distance "B" between the axes 134 and 136 are less than one-third the diameter of the wheels 130, 132.

44 Claims, 14 Drawing Sheets

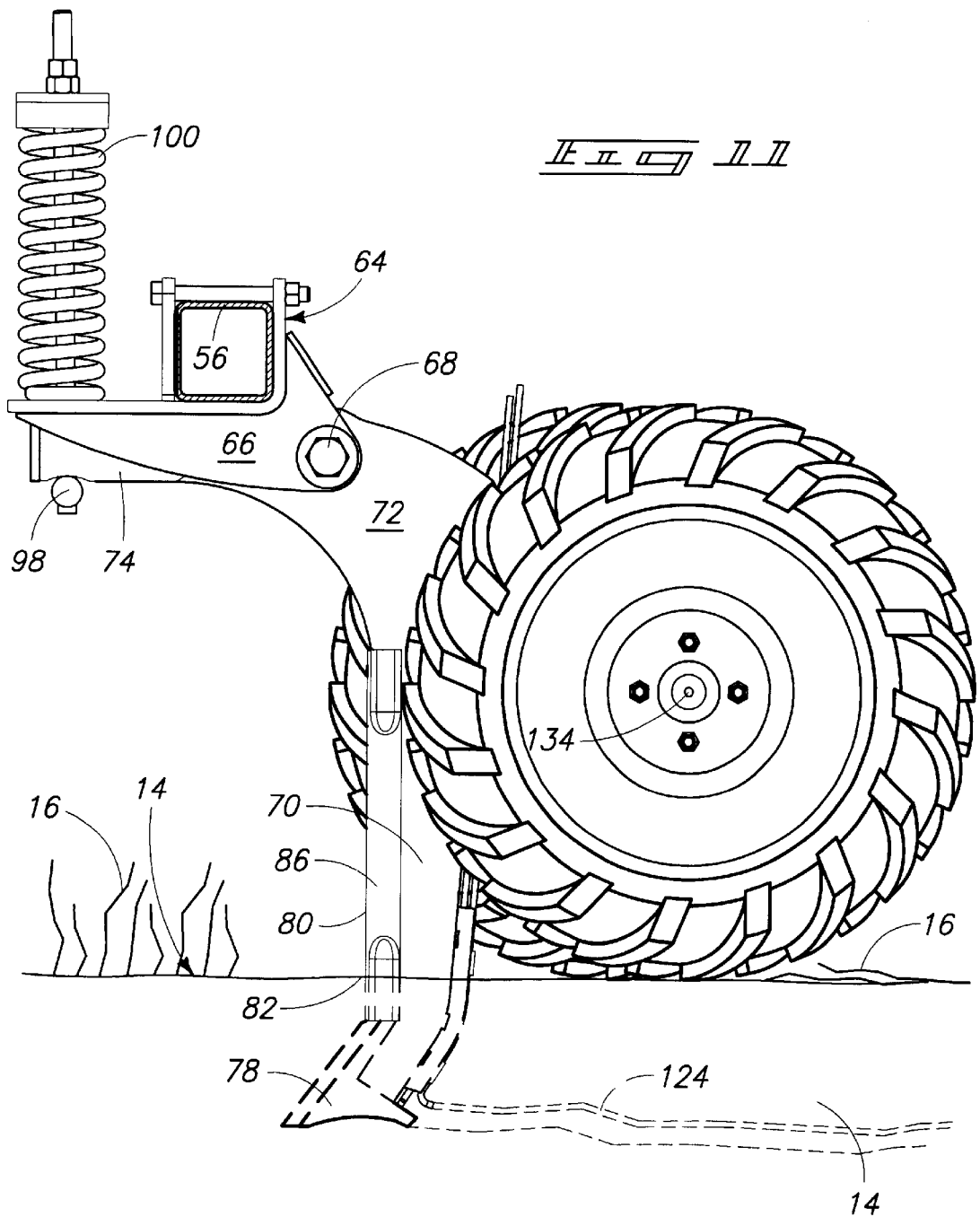

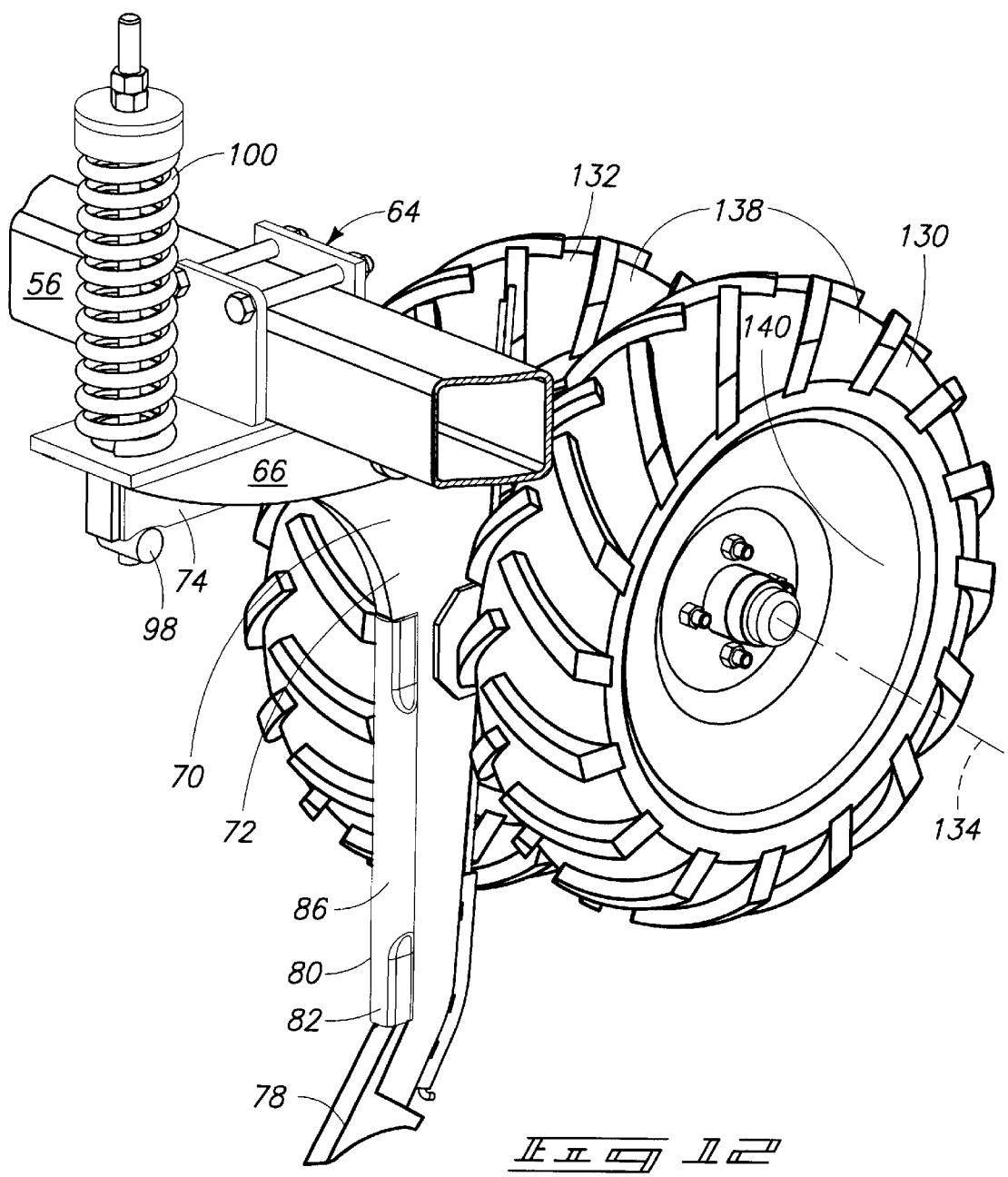

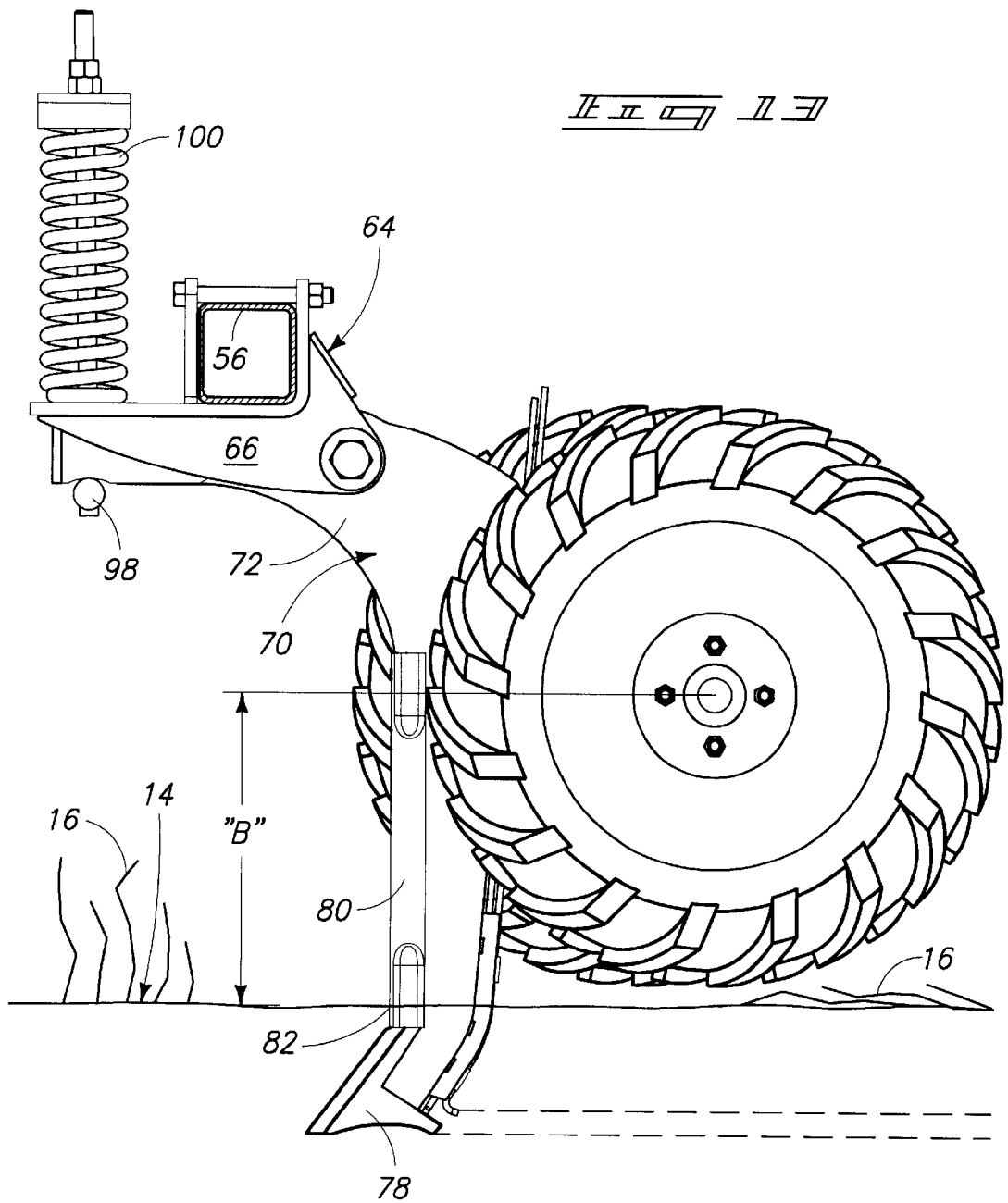

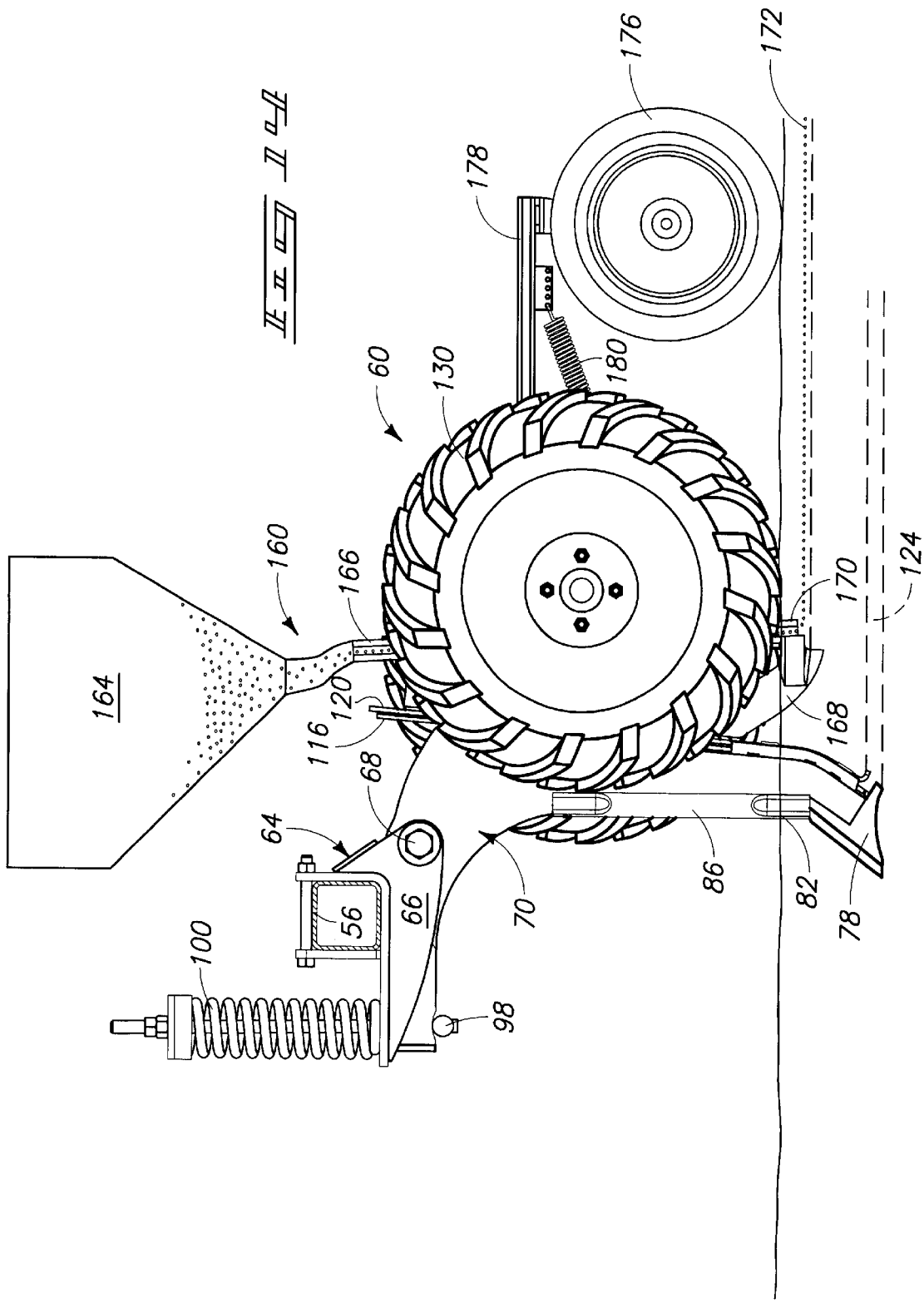

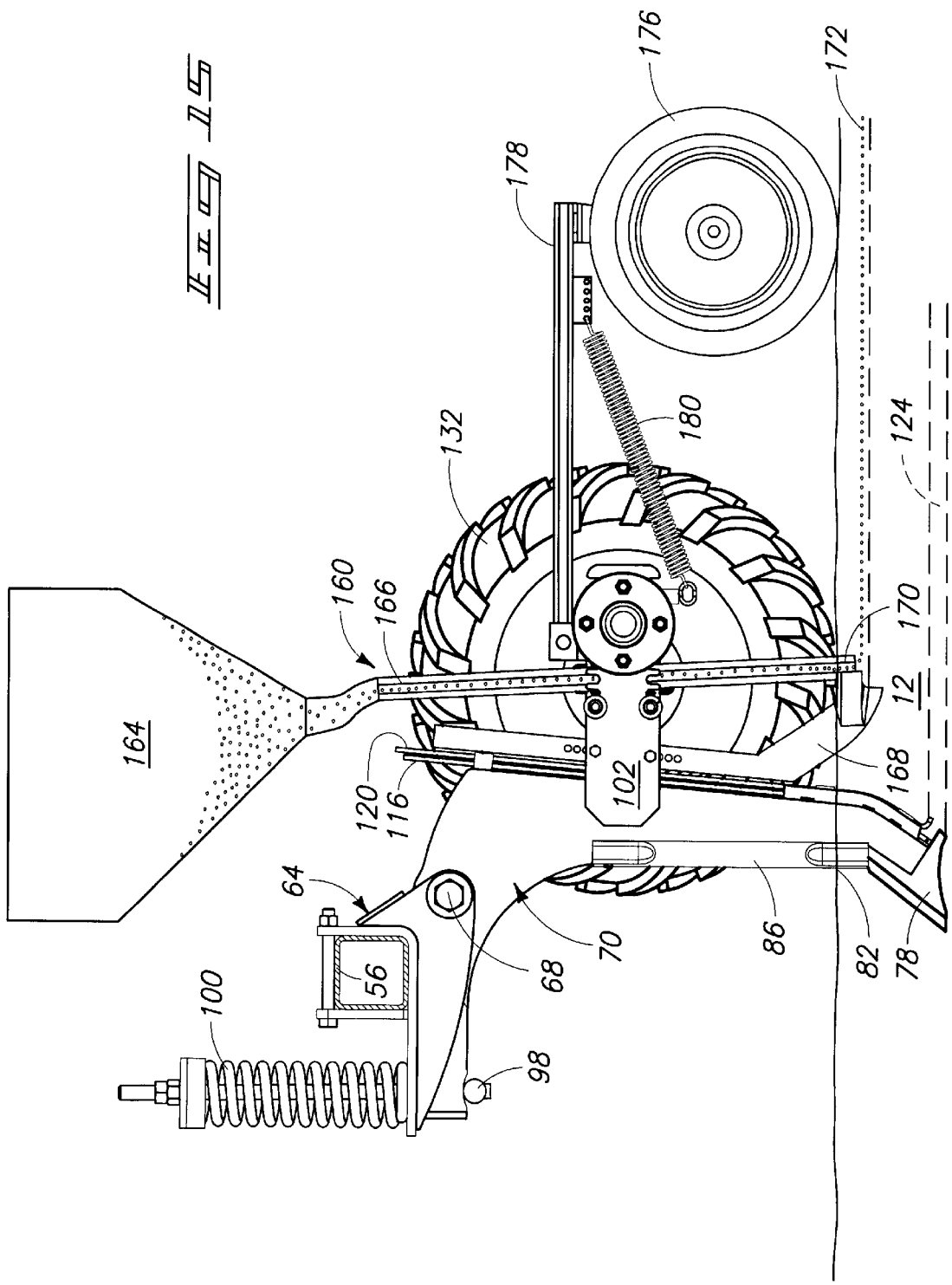

US 6,688,243 B1

MINIMUM TILLAGE AGRICULTURAL IMPLEMENT HAVING FURROW OPENING SHANK ASSEMBLIES

TECHNICAL FIELD

This invention relates to minimum tillage agricultural implements having furrow opening shank assemblies for forming narrow furrows and depositing or "shanking" fertilizer and or seeds therein in soil that is overburdened with agricultural residue.

BACKGROUND OF THE INVENTION

Even though the advantages of minimum tillage agricultural practices in arid and semi-arid soils have been known for some time, their adoption has been rather slow.

One of the problem s has been the difficulty associated with providing efficient high speed implements that are capable of placing or "shanking" fertilizer and/or seeds in the soil with uniform precision when the soil is overburdened with a substantial mat or layer of agricultural residue. Often the residue will bunch, pile or "hair pin" against the furrow opening shanks requiring the implement to either be slowed down or stopped and the built-up residue removed by the operator from in front of the shank. The problem becomes even more difficult when the residue is either wet or quite dense or quite thick. Because of these problems the implements used require application methods that result in higher soil disturbance not conducive to minimum tillage procedures.

Furthermore, to accommodate the residue overburden, the shanks must be taller and spaced further apart, both side-to-side on the same tool bar and front-to-back on multiple tool bars. The side-to-side limitation increases the distances between crop rows per tool bar, requiring more tool bars. The more front-to-back tool bars increases the problems associated with turning the implement at the end of the rows. Often when the implement is turned on a corner or on a side hill the shanks on one tool bar will line up with the shanks on another tool bar resulting in uneven row spacing and inefficient or duplicate application of fertilizer. Additionally, the more tool bars substantially increases the implement framework required to support the increased number of tool bars, thereby substantially increasing the cost of the implement.

Considerable effort has been expended in providing rather expensive devices, called "coulters", forward of the shanks for cutting or slicing through the residue to minimize the bunching up or "hair pinning" of the residue on the front of the shanks. One such design is illustrated in U.S. Pat. No. 4,762,075 issued Aug. 9, 1988 to James W. Halford entitled "Seed/Fertilizer Minimum Tillage Planter". FIGS. 1–4 of the Halford patent show a "coulter" design and FIGS. 5–9 show a non-coulter design that has deflector plates 141 mounted to the shank 15 that extend rearward and outward from the front edge of the shank to deflect trash laterally and rearward away from the shank 15. Such a design has the disadvantage of also deflecting some of the soil uprooted by the shank away from the shank, effectively widening the furrow and compromising the minimum tillage procedure. There are many other patents that show various "coulter" and "non-coulter" designs that are classified in Class 111 of the U.S. Patent Classification System.

The principal object of the present invention is to provide a substantially improved relatively high speed minimum tillage agricultural implement having furrow opening shank assemblies that are more efficient in "shanking" fertilizers or seeds into soils having substantial agricultural residue overburdens.

These and other objects and advantages will become apparent upon reading the following description of a preferred embodiment of the invention along with viewing the drawings.

BRIEF DESCRIPTION OF THE DRAWINGS

Preferred embodiments of the invention are described below with reference to the following accompanying drawings.

FIG. 11 is a fragmentary side elevational view of the alternate shank assembly shown in FIG. 10 further illustrating the residue control wheels being longitudinally offset with one wheel being forward of the other;

FIG. 12 is a fragmentary isometric oblique view of the shank assembly shown in FIG. 11, illustrating the offset residue control wheels from a different angle;

FIG. 13 is a fragmentary side view of another embodiment of a shank assembly illustrating the residue control wheels being elevated above ground level;

FIG. 14 is a fragmentary side elevational view similar to FIG. 7 except showing a further additional alternate embodiment in which the shank assembly is adapted to deposit seeds in the furrow; and FIG. 15 is a fragmentary side elevational view similar to FIG. 14 except with a residue control wheel removed to illustrate details of a seed delivery attachment.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
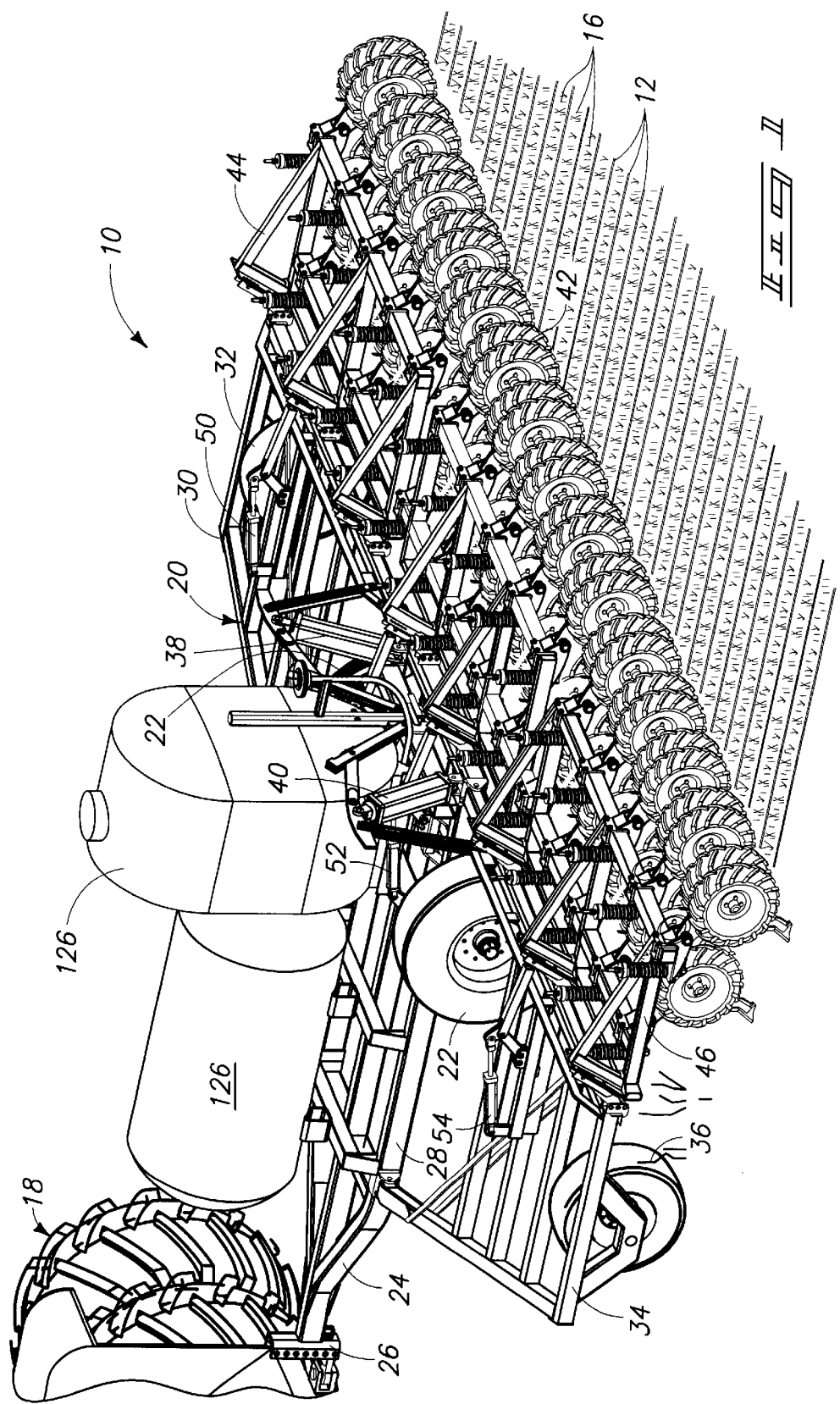
FIG. 1 is an isometric oblique view of a preferred embodiment of an agricultural implement being pulled by a tractor and having two rows of shank assemblies mounted to implement tool bars for creating narrow furrows and depositing fertilizer in the formed furrows.

A preferred embodiment of the present invention is illustrated in FIG. 1 in the form of a minimum tillage agricultural implement generally designated with the numeral 10. The implement 10, when pulled by a pulling vehicle 18 such as a tractor in the intended direction of travel, forms a plurality of laterally spaced narrow parallel furrows 12 below ground level in a soil 14 that is covered with agricultural residue 16 while providing low or minimum soil disturbance. Preferably the furrows 12 are laterally spaced approximately twelve inches on center and are hardly noticeable.

The implement 10 is designed to operate efficiently and rather rapidly in a wide range of agricultural residue conditions, while providing low or minimum soil disturbance. Generally the agricultural residue comprises uncut stubble, cut stubble and other organic agricultural material remaining on the soil after crops have been harvested. It is not unusual for uncut stubble to stand twelve to thirty-six inches above ground level. Cut stubble or straw generally varies from a few inches to twenty-four inches. Generally the density of the agricultural residue varies considerably along with its moisture. A thick layer or blanket of dense, wet residue is generally much more difficult to cultivate than a light, thin layer. Frequently the density and thickness of the agricultural residue will vary considerably within a field and between fields.

The implement 10 includes a mobile framework 20 supported for travel in an intended direction by central support wheels 22. The framework 20 has a tongue 24 with a hitch 26 at a forward end thereof for releasably connecting to the rear of the pulling vehicle 18.

The mobile framework 20 includes (1) a central frame section 28 supported by the wheels 22, (2) a right wing frame section 30 supported by outrigger support wheel 32, and (3) a left wing frame section 34 supported by outrigger support wheel 36. Both the right wing frame section 30 and left wing frame section 34 are pivotally connected to the central frame section 28 for pivotal movement about longitudinal axes from "up" transport positions (not shown) to down working positions (shown in FIGS. 1 and 2). Fluid actuators 38 and 40 are operatively interconnected between frame sections 28, 30 and 34 to pivot the frame sections 30 and 34 by operator control.

Figure 2:
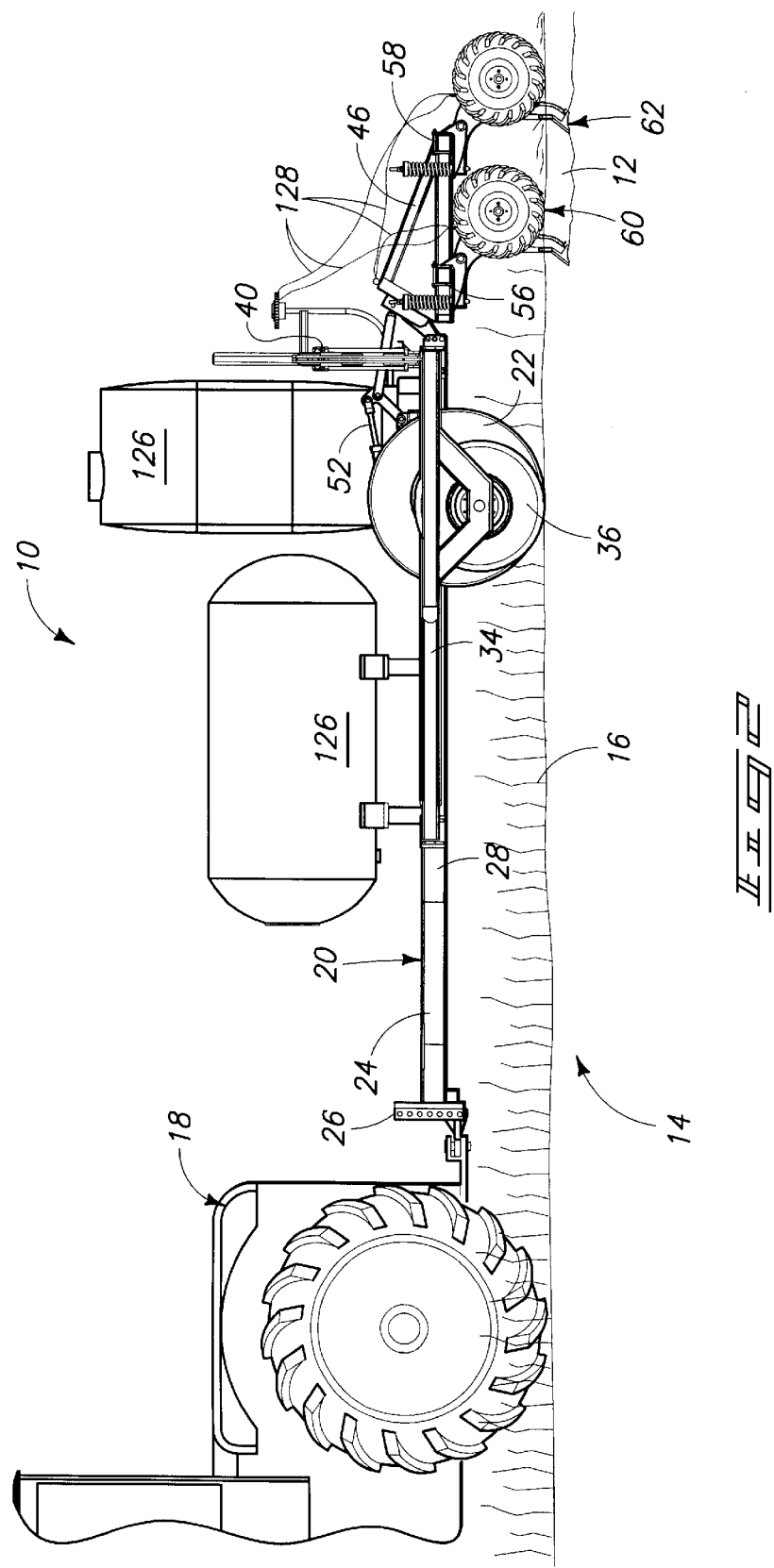
FIG. 2 is left side elevational view of the agricultural implement shown in FIG. 1.
Figure 3:
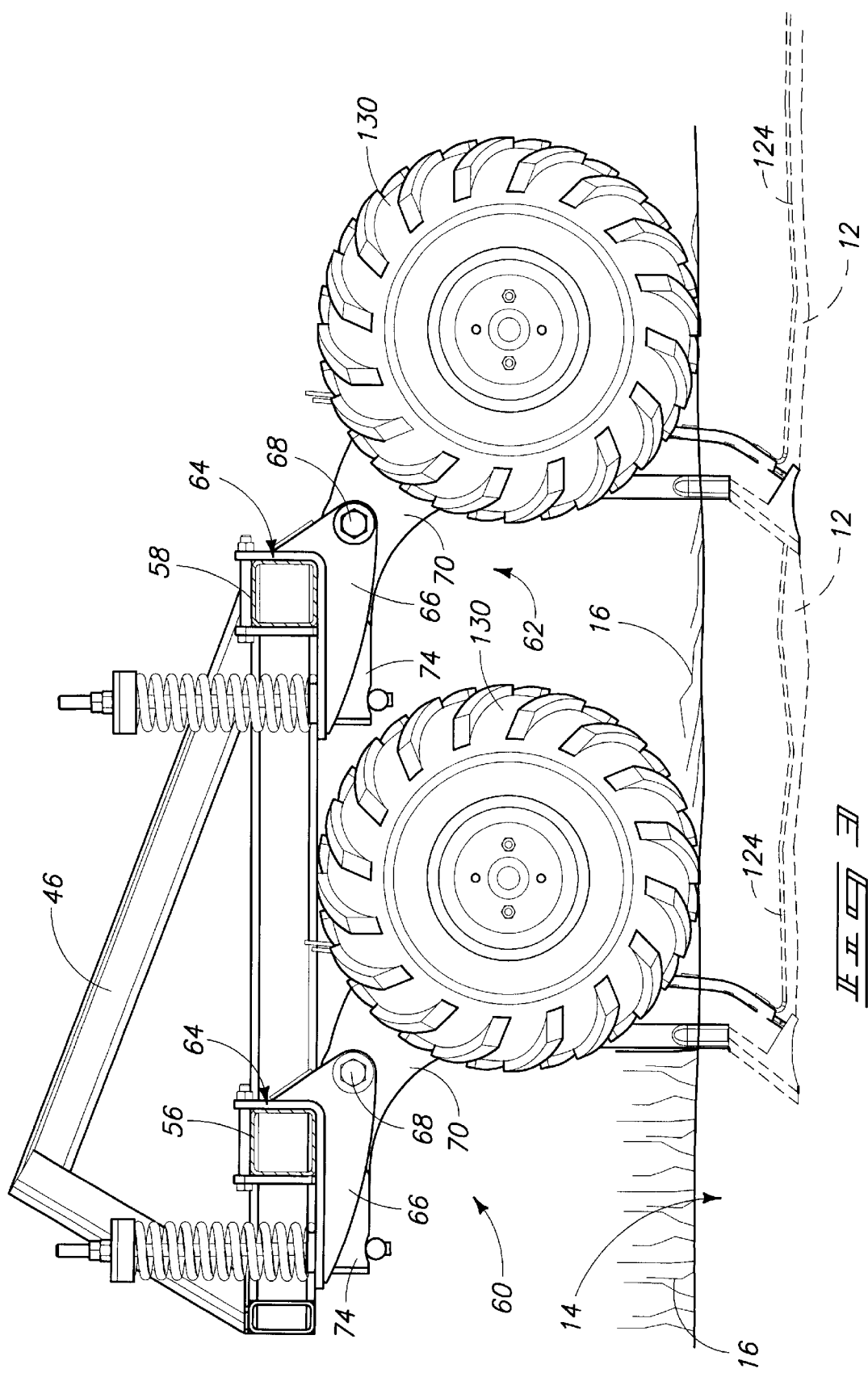
FIG. 3 is a longitudinal vertical cross-section showing a side view of a forward shank assembly and a rearward shank assembly that are longitudinally and laterally offset with respect to each other particularly emphasizing the placement of residue control wheels with respect to respective shanks.

The mobile framework 20 further includes tool bar frame sections 42, 44 and 46 that are pivotally mounted to rear ends of the respective frame sections 28, 30 and 34 for pivotal movement about a generally common transverse axis between "up out of the ground" nonworking positions (not shown) and "down in the ground" working positions (shown in FIGS. 1 and 2). Individual fluid actuator sub-assemblies 50, 52 and 54 are independently interconnected between the front frame sections 28, 30 and 34 and the tool bar frame sections 42, 44, and 46 to raise and lower the tool bar frame sections 42, 44, and 46 under operator control. Each of the tool bar frame sections 42, 44, and 46 carry a front row tool bar 56 and a rear row tool bar 58.

The minimum tillage agricultural implement 10 importantly has a plurality of front row shank assemblies 60 and rear row shank assemblies 62 mounted on the respective tool bars 56 and 58 at laterally spaced intervals. The rear shank assemblies 62 are laterally interspersed between the shank assemblies of the front row. Preferably the shank assemblies 60 and 62 are evenly spaced between each other to provide evenly spaced rather close together furrows. Many farmers produce furrows that are spaced at a common spacing of approximately twelve inches on center. However, other desired spacings may be accommodated, either even or uneven.

Each of the shank assemblies 60 and 62 has a mounting bracket 64 for attaching the assembly 60, 62 to one of the tool bars 56, 58. The mounting bracket 64 includes spaced side flanges 66 that extend rearward and downward supporting a transverse pivot shaft or bolt 68 that defines a shank pivot axis.

Figure 7:
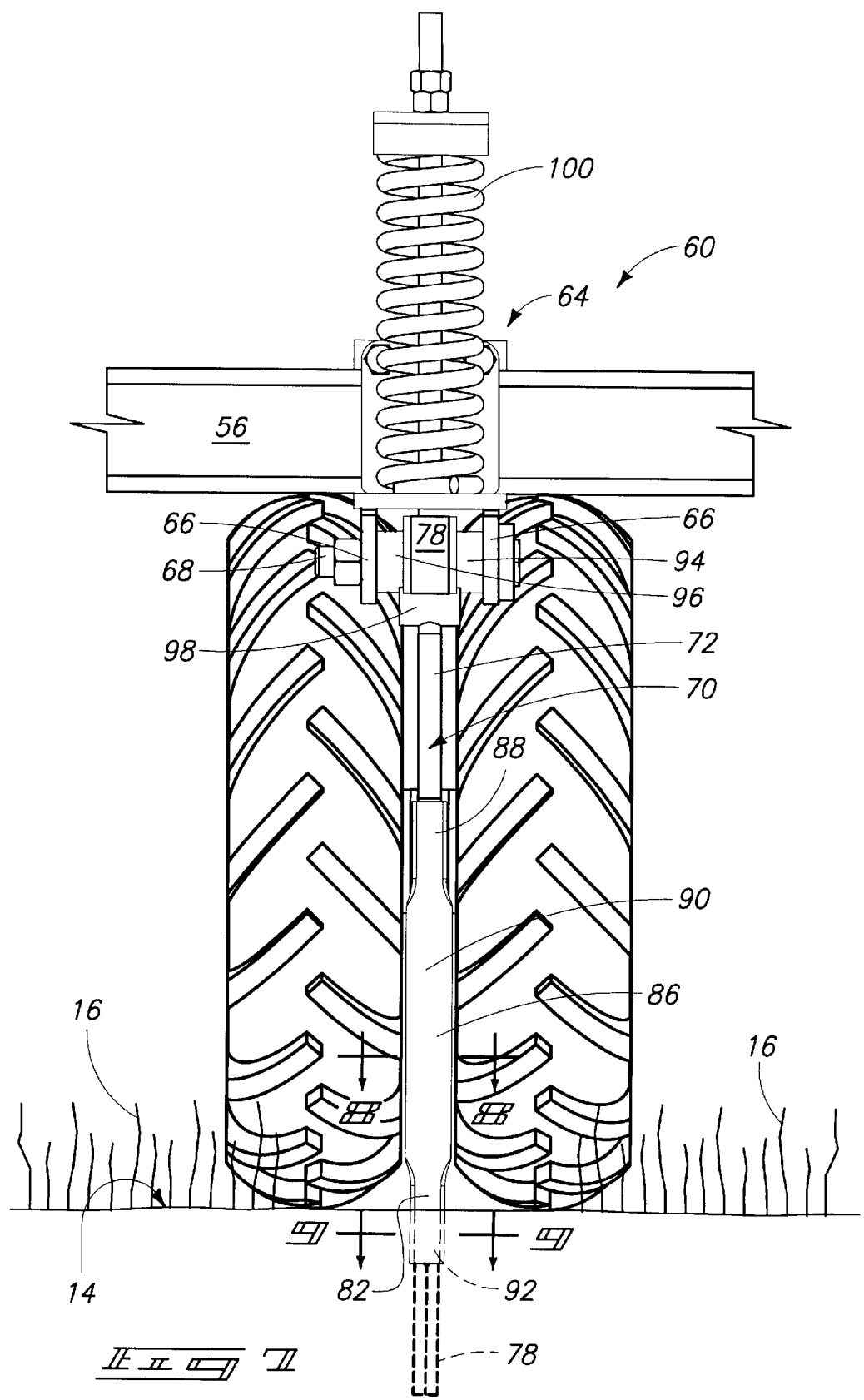
FIG. 7 is a fragmentary vertical front view of the forward shank assembly shown in FIG. 4.

Each shank assembly 60, 62 includes an elongated narrow shank 70 that is pivotally mounted on the pivot shaft 68 for swinging movement about the shank pivot axis. The shank 70 is preferably made of a strong steel plate material of between one-half inch and one inch in thickness. The shank 70 extends from an upper end 72, through a normally upright elongated central section 76 to a lower working wear point 78. The lower working wear point 78 extends downward and forward to dislodge and lift a thin slot of soil to form the narrow furrow 12 when the tool bar frame sections are in their working positions. The upper end 72 is welded to a single shaft spacer with equally spaced sides 94 and 96 and is rotatably affixed on pivot shaft 68 and mounted between flanges 66 on mounting bracket 64 to center the narrow shank 70 relative to the attachment bracket 64 (see FIGS. 4 and 7).

Figure 5:
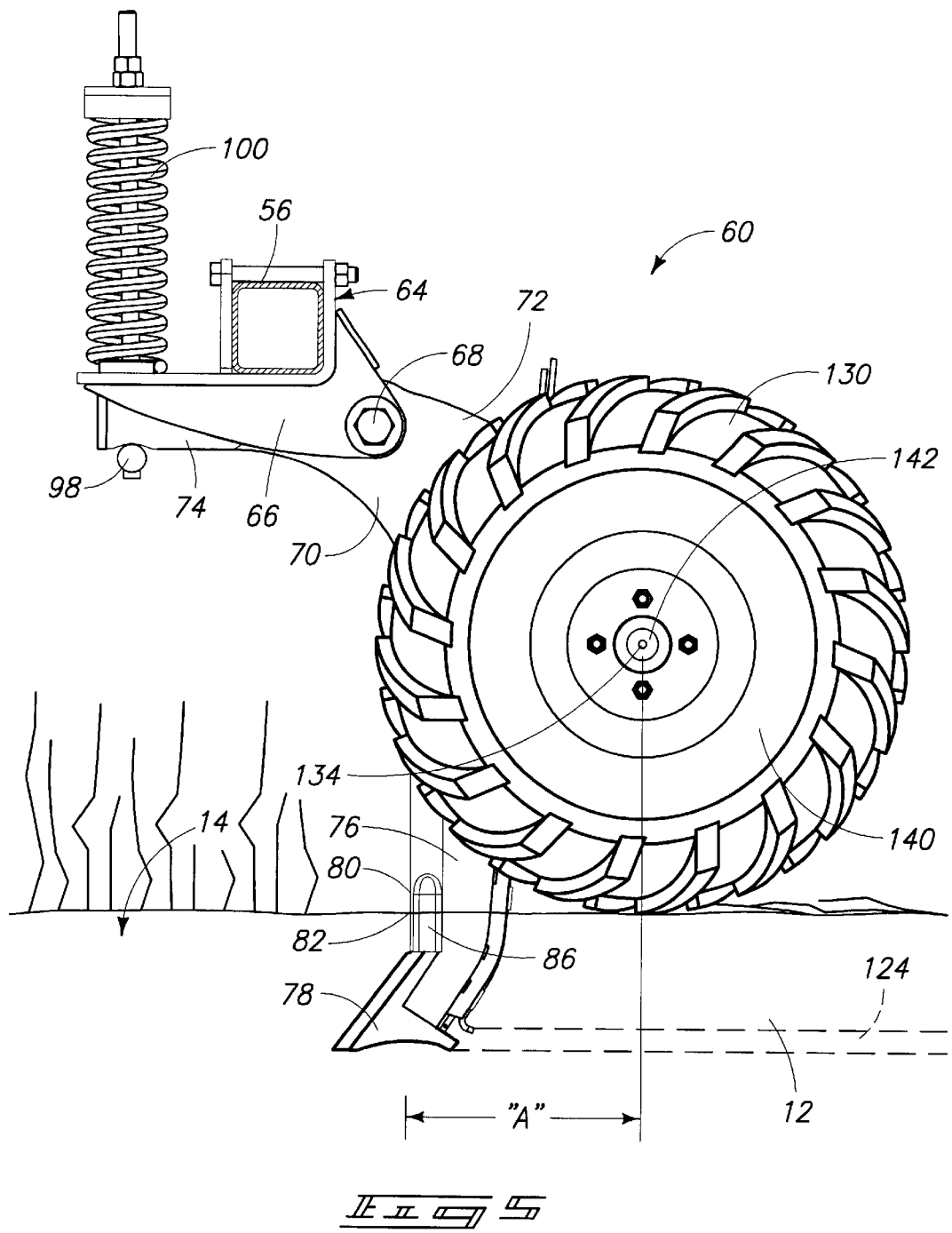
FIG. 5 is a fragmentary side elevational view of the forward shank assembly shown in FIG. 4.

The upper end 72 of the shank 70 has a forward projection 74 that projects forward of the pivot shaft 68 and underneath the mounting bracket 64. The shank assemblies 60, 62 have spring bias mechanisms that engage the forward projections 74 to normally bias the shanks 70 to their downward working positions as illustrated in FIGS. 2 and 5, while enabling the shanks 70 to pivot upward about the axes of the pivot shafts 68 should the shanks 70 encounter a substantial obstruction. As soon as the shank 70 clears the obstruction the spring biasing mechanisms automatically return the shank 70 to its working position.

The spring biasing mechanisms include a yoke 98 that is operatively interconnected between the forward projection 74 and the bracket 64 to restrict the movement of the shank 70. A compression spring 100 is mounted on the bracket 64 and engages the yoke 98 to spring bias the forward projection 74 clockwise as illustrated in FIGS. 2 and 5 to maintain the shank 70 in its normal working position.

The upright elongated central section 76 of the shank 70 has a narrow leading edge 80 intended to engage the agricultural residue immediately in front of the shank 70. The leading edge 80 extends downward from the upper end 72 to a front edge reference segment 82 that engages the soil at ground level (See FIG. 5). The working point 78 extends downward and forward from the front edge segment 82 for forming the narrow furrow.

Figure 9:
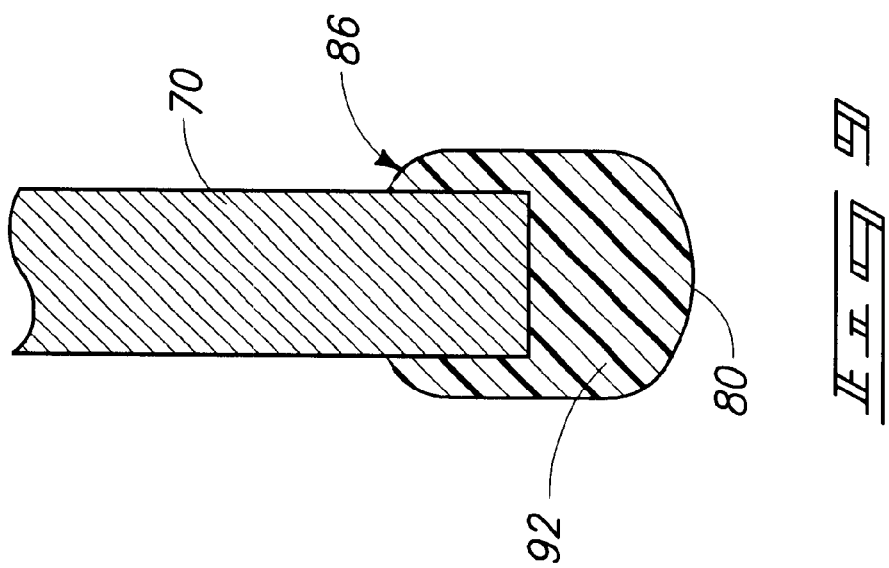
FIG. 9 is a fragmentary horizontal cross-section taken along line 9—9 in FIG. 7 showing the cross-section of the lower portion of the wear-resistant front edge of the shank.
Figure 8:
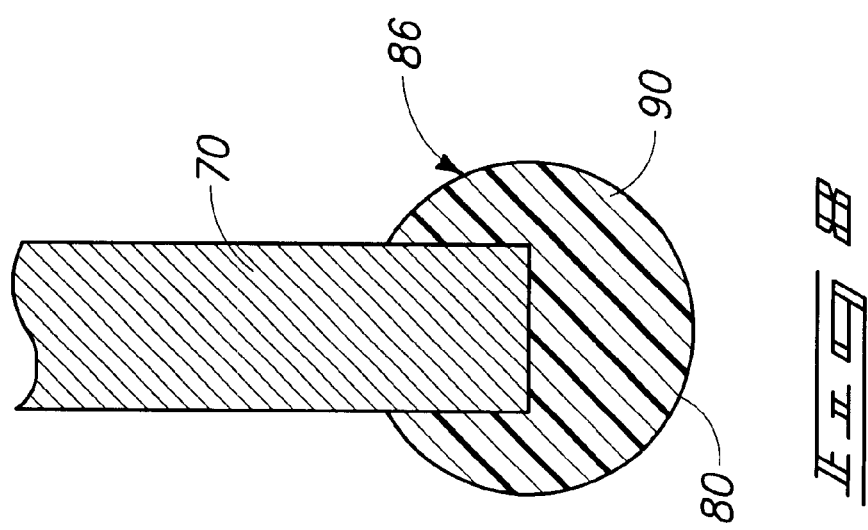
FIG. 8 is a fragmentary horizontal cross-sectional view taken along line 8—8 in FIG. 7 illustrating a cross-section of a central portion of a wear-resistant front edge of the shank.

In a preferred embodiment, the leading edge 80 is a narrow wear-resistant deflector 86 formed from a low coefficient of friction plastic material to minimize build-up of residue and soil along the leading edge 80. Preferably, the plastic deflector 86 is formed from a high density molecular weight (UHMW) plastic material that is often used for low-coefficient of friction bearing material. Preferably, the deflector 86 has a "C" shaped cross-section as illustrated in FIGS. 8 and 9. The deflector 86 has a central body 90 with necked down or thinner upper and lower ends 88 and 92 respectively. Preferably, the necked down lower end extends below the front edge reference segment 82 and into the soil at ground level.

Figure 4:
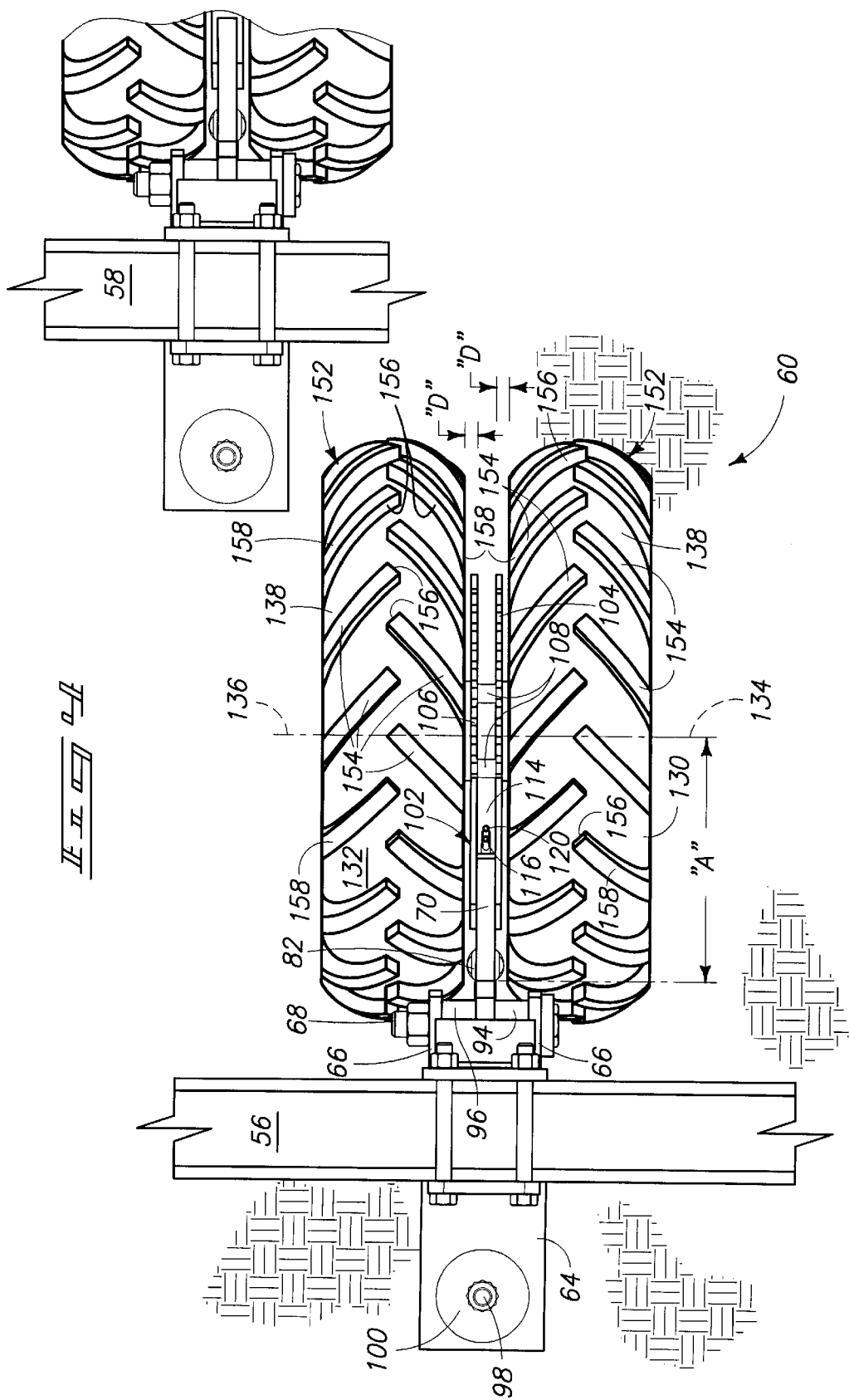
FIG. 4 is a fragmentary planar top view of the forward shank assembly shown in FIG. 3 showing the forward shank assembly with a pair of residue control wheels straddling a respective shank.
Figure 6:
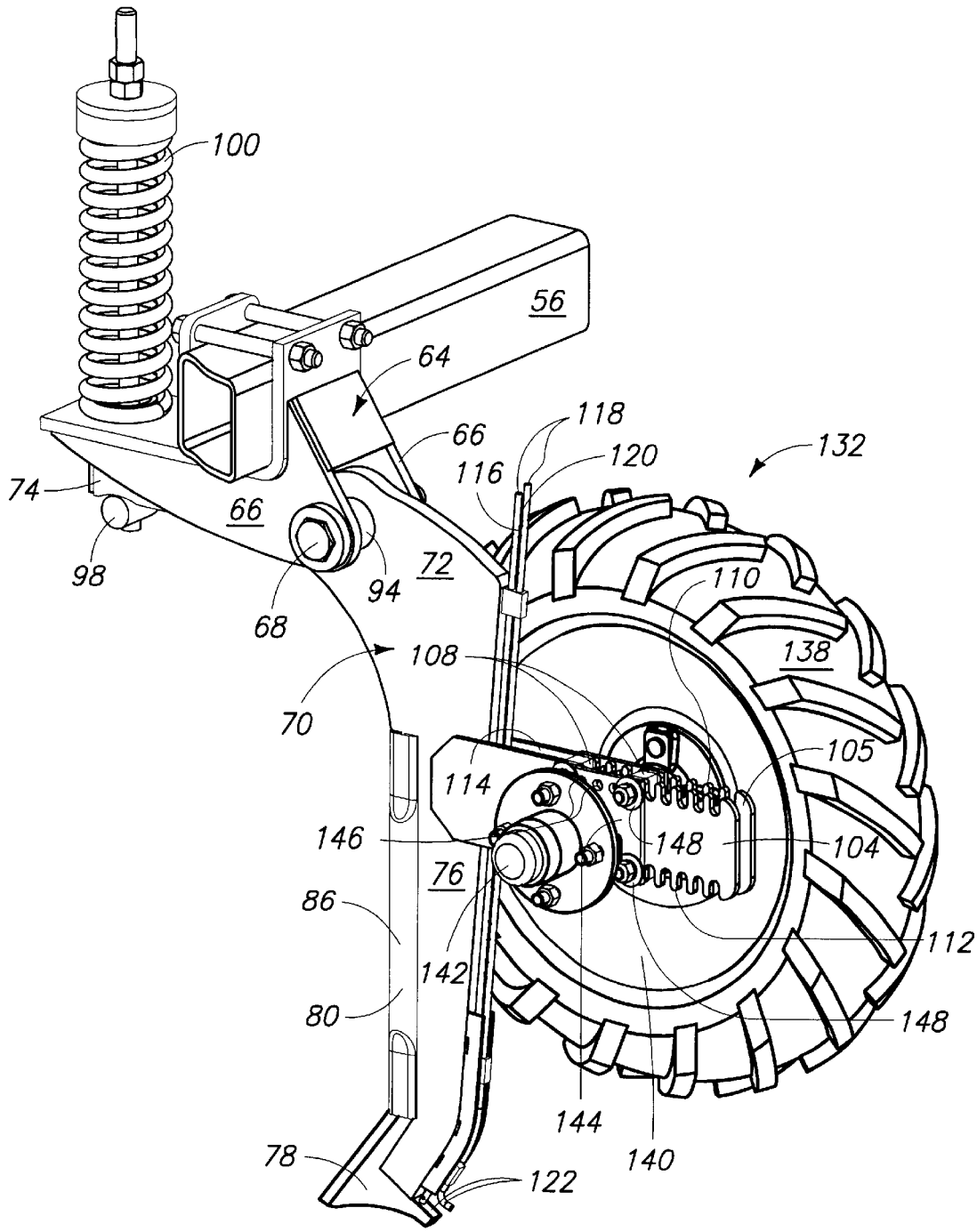
FIG. 6 is a fragmentary oblique isometric similar to FIG. 5 except with a left residue control wheel removed illustrating details of a residue wheel support bracket relative to a respective shank.
Figure 10:
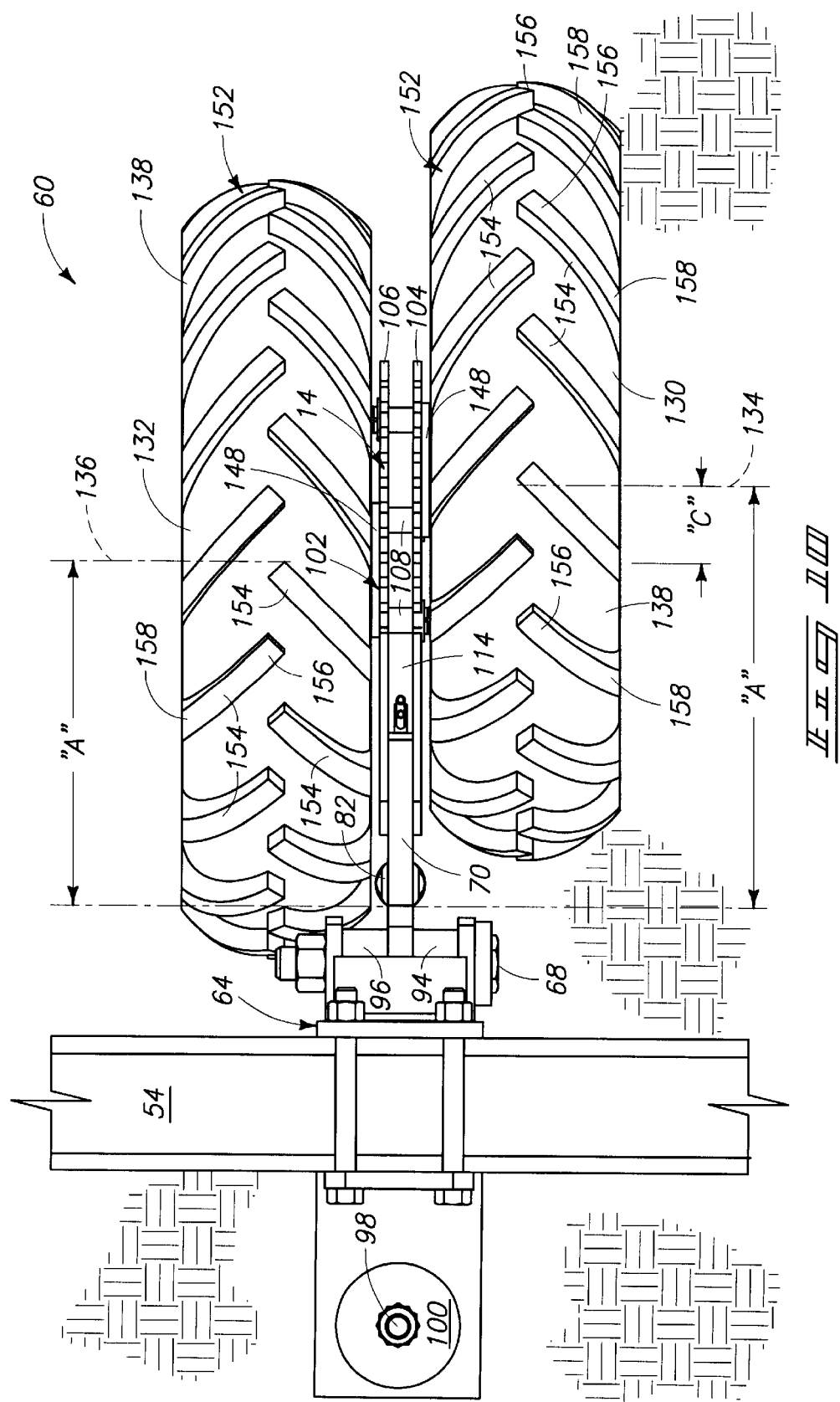
FIG. 10 is a fragmentary plan view of an alternate shank assembly in which the residue control wheels are longitudinally offset with one wheel being forward of the other.

At least one of the shanks 70 (and preferably a majority or all of the shanks 70) has a residue control wheel support bracket 102 affixed to shank 70 and extending rearward therefrom as illustrated in FIGS. 4, 6 and 10. Preferably the support bracket 102 has side wings or plates 104 and 106 affixed to sides of the central section 76 of the shank 70. Apertured spacers 108 are positioned between plates 104 and 106 rearward of the shank 70 to maintain a desired bracket rigidity and spacing between the plates 104 and 106 rearward of the shank 70.

The plates 104 and 106 have rows of complementary spaced upper and lower vertical mounting slots 110 and 112 formed therein at desired intervals rearward of the shank 70. Immediately rearward of the shank 70 a multi-tube opening 114 is formed between the plates 104 and 106 to allow elongated fertilizer tubes 116 and 120 to conveniently extend downward from upper ends 118 to lower ends 122 (FIG. 6) along a rear edge of the shank 70. Preferably the lower ends 122 extend downward below the front edge reference segment 82 to deposit fluid fertilizers into the narrow furrow 12 rearward of the working point forming a fertilizer band 124 in the narrow furrow 12. The fertilizers are stored in fertilizer containers 126 supported on the mobile framework 20 and distributed to the tubes 116 and 120 through distribution lines 128 (FIG. 2).

One or more of the shank assemblies 60 and 62 (and preferably a vast majority) has a set of rotatable residue control wheels 130 and 132 that are mounted to the residue control wheel support bracket 102. The residue control wheels 130 and 132 straddle the shank 70 for engaging the soil and agricultural residue and efficiently stabilizing the soil and residue downward and underneath the wheels 130 and 132 and away from the shank 70 to prevent the soil and agricultural residue from building up along the leading edge 80 of the shank 70.

Each of the wheels 130 and 132 has a prescribed diameter. Applicant has found that wheels having diameters of between 16 and 26 inches are preferable. Preferably each wheel 130 and 132 have pneumatic tires 138 that are mounted on rims 140. The rims 140 are mounted on hubs 142 that are in turn rotatably mounted to axle plates 144. Each axle plate 144 has apertures 146 formed therein that are spaced complementary to the spacing of the bracket slots 110 and 112. The axle plates 144 are securely mounted to the bracket 102 by mounting bolts 148. The spacing and number of slots 110 and 112 and apertures 146 enable the plates 144 to be adjustably mounted at various desired distances rearward of the shank 70.

The wheel 130 rotates about transverse axis 134 and wheel 132 rotates about transverse axis 136. In one embodiment the axes 134 and 136 are co-axial and in a second embodiment the axes 134 and 136 are offset in the direction of travel.

Each of the wheels 130 and 132 are mounted to the wheel support bracket 102 with their respective rotational axes 134 and 136 positioned rearward of the front edge reference segment 82 in the direction of travel, a distance "A", illustrated in FIGS. 4, 5 and 10, of less than the diameters of the wheels 130 and 132, respectively. Preferably, the distance "A" is less than three-quarters of the diameters of the wheels 130 and 132, respectively. Most preferably, the distance "A" is between one-quarter and three-quarters of the diameters of the wheels 130 and 132, respectively.

Additionally, each of the wheels 130 and 132 are mounted to the wheel support bracket 102 with their respective axes 134 and 136 positioned elevationally above the front edge reference segment 82 a vertical distance "B", illustrated in FIG. 13 of between three-eights and three-quarters of the diameters of the wheels 130 and 132, respectively. Preferably, the vertical distance "B" is between seven-sixteenths and eleven-sixteenths of the diameters of the wheels 130 and 132, respectively. Most preferably, the vertical distance "B" is between one-half and eleven-eighteenths of the diameters of the wheels 130, 132, respectively.

In an alternate embodiment, the wheels 130 and 132 are offset with respect to each other so that one wheel such as 132 is forward of the other wheel 130 as illustrated in FIGS. 10–14. In such an embodiment the leading wheel 132 becomes the more dominant wheel most frequently processing and controlling a majority of the agricultural residue.

In the offset configuration, the offset distance "C" (FIG. 10) is less than one-third of the diameter of the forward wheel 132. Preferably, the offset distance "C" is between one-twelfth and one-fifth of the diameter of forward wheel 132.

Furthermore, it should be noted that the wheels 130 and 132 straddle the shank 70 with the sides of the wheels 130 and 132 being in close proximity to the sides of the shank 70. Preferably the wheels 130 and 132 are laterally spaced immediately adjacent the side walls of the shank 70. Preferably the wheels 130 and 132 are spaced lateral distances "D", illustrated in FIG. 4, of less than width of the wheels 130 and 132, respectively. Most preferably, the lateral distances "D" are less than onehalf the width of the wheels 130 and 132, respectively.

As previously mentioned, each of the wheels 130 and 132 preferably has a pneumatic tire 138 for stabilizing engaged soil and agricultural residue downward and then under the tire and away from the shank 70. Preferably, each of the tires 138 has a traction tread 152 with a plurality of inclined lugs 154 that extend outward and forward in the direction of rotation from an inner end 156 adjacent a center of the tire 138 to an outer end 158 near the outer edge of the tire 138.

In a still further embodiment, the implement 10 has a seed planter attachment 160, illustrated in FIGS. 14 and 15. The seed planter attachment 160 includes a seed supply 164 that is mounted on the mobile framework 20. Seeds from the supply 164 are distributed through seed distribution conduit 166 to a seed conduit support shank 168 that is adjustably mounted to the support bracket 102. The seed conduit 166 extends downward along the shank 168 terminating at a lower end 170 of the shank 168 that extends downward into the narrow furrow 12 for depositing seeds in a seed zone 172 above the fertilizer band 124. Preferably, the seed planter attachment 160 includes a furrow press wheel 176 that is mounted on a support arm 178 that extends rearward from the support bracket 102 in longitudinal alignment with the furrow 12. A tension spring 180 is connected to the support arm 178 to bias the arm 178 and the press wheel downward firmly in contact with the loosened soil to compact the loosened soil into the furrow to close the furrow and cover the fertilizer band 124 and the seed zone 172.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A minimum tillage agricultural implement for forming spaced parallel, narrow furrows in a soil covered with agricultural residue comprising:

a mobile framework having one or more toolbars extending laterally with respect to an intended direction of travel;

a plurality of shank assemblies mounted at spaced intervals along the toolbar;

each of the shank assemblies having a generally thin upright shank operatively connected to the toolbar and extending downward to a soil engaging work point that projects downward and forward into the soil below the agricultural residue to form a narrow furrow in the soil below ground level as the implement is moved in its intended direction of travel with a front edge segment of the shank engaging the soil at ground level;

wherein at least one of the shank assemblies has a pair of residue control wheels mounted on the assembly that straddle the shank for engaging the residue and deflecting the residue downward underneath the wheels and away from the shank as the furrow is being formed to minimize build-up of the residue in front of the shank and to enable the implement to move rapidly in the intended direction of travel despite the presence of the agricultural residue covering the soil; and wherein each residue control wheel has a wheel diameter and is rotatable about a wheel axis in which the wheel axis is located longitudinally rearward of the front edge segment of the shank in the direction of travel at a distance less than the wheel diameter.

2. The minimum tillage agricultural implement as defined in claim 1 wherein the axis of the residue control wheel is rearward of the front edge segment of the shank a distance less than three-quarters of the wheel diameter.

3. The minimum tillage agricultural implement as defined in claim 2 wherein the axis of the residue control wheel is rearward of the front edge segment of the shank a distance of between one-quarter and three-quarters of the wheel diameter.

4. The minimum tillage agricultural implement as defined in claim 3 wherein the axis of the residue control wheel is upward of the front edge segment of the shank a distance of between three-eighths and three-quarters of the wheel diameter.

5. The minimum tillage agricultural implement as defined in claim 3 wherein the axis of the residue control wheel is upward of the shank front edge segment a distance of between seven-sixteenths and eleven-sixteenths of the wheel diameter.

6. The minimum tillage agricultural implement as defined in claim 5 wherein the axis of the residue control wheel is upward of the shank front edge segment a distance of between one-half and eleven-eighteenths of the wheel diameter.

7. The minimum tillage agricultural implement as defined in claim 1 wherein residue control wheels are longitudinally offset with respect to each other in the direction of travel of the implement in which one wheel is forward of the other.

8. The minimum tillage agricultural implement as defined in claim 7 wherein the offset distance between the axes of the residue control wheels is less than one-third the diameter of the forward wheel.

9. The minimum tillage agricultural implement as defined in claim 8 wherein the offset distance between the axes of the residue control wheels is between one-twelfth and one-fifth the diameter of the forward wheel.

10. The minimum tillage agricultural implement as defined in claim 3 wherein residue control wheels are additionally longitudinally offset with respect to each other in the direction of travel of the implement in which one wheel is forward of the other a distance of between one-twelfth and one-fifth the diameter of the forward wheel.

11. The minimum tillage agricultural implement as defined in claim 1 wherein the shank assembly having the pair of residue control wheels has a residue control wheel mounting bracket affixed to the shank and extending rearward for supporting the residue control wheels.

12. The minimum tillage agricultural implement as defined in claim 11 wherein the residue control wheel mounting bracket has an adjustment feature for enabling the residue control wheels to be adjustably mounted to the bracket at various longitudinal locations relative to the front edge segment of the shank to enable the implement to be adjusted to various agricultural residue conditions.

13. The minimum tillage agricultural implement as defined in claim 12 wherein the adjustment feature additionally enables the residue control wheels to be adjustably mounted to the bracket at various vertical locations relative to the front edge segment of the shank to enable the implement to be adjusted to various agricultural residue conditions.

14. The minimum tillage agricultural implement as defined in claim 1 wherein at least th e one shank assembly has one or more conduits extending downward along a rear edge of the shank terminating below the front edge segment of the shank for delivering fertilizer into the formed narrow furrow.

15. The minimum tillage agricultural implement as defined in claim 14 wherein the one shank assembly has a residue control wheel support bracket affixed to the shank and extending rearward from the rear edge of the shank for receiving the residue control wheels and wherein the residue control wheel support bracket has an opening formed therein for receiving the one or more of the fertilizer conduits.

16. The minimum tillage agricultural implement as defined in claim 1 wherein the one shank assembly has a thin wear-resistant plastic deflector mounted on a leading edge of the shank to facilitate the deflection of the agricultural residue to the sides of the shank.

17. The minimum tillage agricultural implement as defined in claim 16 where the thin wear-resistant plastic deflector is composed of a high density molecular weight (UHMW) plastic having a low co-efficient of friction to minimize build-up of soil or agricultural residue along the leading edge of the shank.

18. The minimum tillage agricultural implement as defined in claim 1 wherein the residue control wheels are laterally spaced from the sides of the shank distances less than respective widths of the residue control wheels.

19. The minimum tillage agricultural implement as defined in claim 18 wherein the residue control wheels are located immediately adjacent the sides of the shank at distances less than one-half of the widths of the residue control wheels.

20. The minimum tillage agricultural implement as defined in claim 1 wherein the residue control wheels have pneumatic tires.

21. The minimum tillage agricultural implement as defined in claim 20 wherein the pneumatic tires have ribbed treads in which the treads extend at an incline outward and forward in the direction of rotation to facilitate gripping and stabilizing the soil and agricultural residue downward and under the wheels and away from the shank as the implement is propelled over the soil.

22. A minimum tillage shank assembly for mounting on a toolbar of a mobile agricultural implement for forming a narrow furrow in a soil covered with agricultural residue, comprising:

said shank assembly having a generally thin upright shank operatively connected to the toolbar and extending downward to a soil engaging work point that projects downward and forward into the soil below the agricultural residue to form a narrow furrow in the soil below ground level as the implement is moved in its intended direction of travel with a front edge segment of the shank engaging the soil at ground level;

a pair of residue control wheels mounted on the assembly that straddle the shank for engaging the soil and residue and stabilizing the soil and residue downward underneath the wheels and away from the shank as the furrow is being formed to minimize build-up of the residue in front of the shank and to enable the implement to move rapidly in the intended direction of travel despite the presence of the agricultural residue covering the soil; and wherein each residue control wheel has a wheel diameter and is rotatable about a wheel axis in which the wheel axis is located longitudinally rearward of the front edge segment of the shank in the direction of travel at a distance less than the wheel diameter.

23. The minimum tillage shank assembly as defined in claim 22 wherein the axis of the residue control wheel is rearward of the front edge segment of the shank a distance less than three-quarters of the wheel diameter.

24. The minimum tillage shank assembly as defined in claim 23 wherein the axis of the residue control wheel is rearward of the front edge segment of the shank a distance of between one-quarter and three-quarters of the wheel diameter.

25. The minimum tillage shank assembly as defined in claim 24 wherein the axis of the residue control wheel is upward of the front edge segment of the shank a distance of between three-eighths and three-quarters of the wheel diameter.

26. The minimum tillage shank assembly as defined in claim 24 wherein the axis of the residue control wheel is upward of the shank front edge segment a distance of between seven-sixteenths and eleven-sixteenths of the wheel diameter.

27. The minimum tillage shank assembly as defined in claim 26 wherein the axis of the residue control wheel is upward of the shank front edge segment a distance of between one-half and eleven-eighteenths of the wheel diameter.

28. The minimum tillage shank assembly as defined in claim 22 wherein the residue control wheels are longitudinally offset with respect to each other in the direction of travel of the implement in which one wheel is forward of the other.

29. The minimum tillage shank assembly as defined in claim 28 wherein the longitudinal offset distance between the axes of the residue control wheels is less than one-third the diameter of the forward wheel.

30. The minimum tillage shank assembly as defined in claim 29 wherein the longitudinal offset distance between the axes of the residue control wheels is between one-twelfth and one-fifth the diameter of the forward wheel.

31. The minimum tillage shank assembly as defined in claim 24 wherein residue control wheels are additionally longitudinally offset with respect to each other in the direction of travel of the implement in which one wheel is forward of the other a distance of between one-twelfth and one-fifth the diameter of the forward wheel.

32. The minimum tillage shank assembly as defined in claim 22 wherein the shank assembly has a residue control wheel mounting bracket affixed to the shank and extending rearward for supporting the residue control wheels.

33. The minimum tillage shank assembly as defined in claim 32 wherein the residue control wheel mounting bracket has an adjustment feature for enabling the residue control wheels to be adjustably mounted to the bracket at various longitudinal locations relative to the front edge segment of the shank to enable the implement to be adjusted to various agricultural residue conditions.

34. The minimum tillage shank assembly as defined in claim 33 wherein the adjustment feature additionally enables the residue control wheels to be adjustably mounted to the bracket at various vertical locations relative to the front edge segment of the shank to enable the implement to be adjusted to various agricultural residue conditions.

35. The minimum tillage shank assembly implement as defined in claim 22 further comprising one or more conduits extending downward along a rear edge of the shank terminating below the front edge segment of the shank for delivering fertilizer into the formed narrow furrow.

36. The minimum tillage shank assembly as defined in claim 35 further comprising a residue control wheel support bracket affixed to the shank and extending rearward from the rear edge of the shank for receiving the residue control wheels and wherein the residue control wheel support bracket has an opening formed therein for receiving the one or more of the fertilizer conduits.

37. The minimum tillage shank assembly as defined in claim 22 further comprising a thin wear-resistant plastic deflector mounted on a leading edge of the shank to facilitate the deflection of the agricultural residue to the sides of the shank.

38. The minimum tillage shank assembly as defined in claim 37 wherein the thin wear-resistant plastic deflector is composed of a high density molecular weight (UHMW) plastic having a low co-efficient of friction to minimize build-up of soil or agricultural residue along the leading edge of the shank.

39. The minimum tillage shank assembly as defined in claim 22 wherein the residue control wheels are laterally spaced from the sides of the shank distances less than the respective widths of the residue control wheels.

40. The minimum tillage shank assembly as defined in claim 39 wherein the residue control wheels are located immediately adjacent to the sides of the shank at distances less than one-half of the widths of the residue control wheels.

41. The minimum tillage shank assembly as defined in claim 22 wherein the residue control wheels have pneumatic tires.

42. The minimum tillage shank assembly as defined in claim 41 wherein the pneumatic tires have ribbed treads in which the treads extend at an incline outward and forward in the direction of rotation to facilitate gripping and stabilizing the soil and agricultural residue downward and under the wheels and away from the shank as the implement is propelled over the soil.

43. The minimum tillage agricultural implement as defined in claim 1 further comprising a seed planter attachment mounted on the shank assembly rearward of the shank for placing seeds into the furrow.

44. The minimum tillage shank assembly as defined in claim 22 wherein a seed planter attachment is mounted on the shank assembly for placing seeds into the furrow rearward of the shank.

* * * * *